United States Patent
Chen et al.

(10) Patent No.: US 7,747,685 B2
(45) Date of Patent: Jun. 29, 2010

(54) METHOD FOR AUTOMATIC DETECTION OF DISPLAY SHARING AND ALERT GENERATION IN INSTANT MESSAGING

(75) Inventors: Yen-Fu Chen, Austin, TX (US); John Hans Handy-Bosma, Cedar Park, TX (US); Mei Yang Selvage, Austin, TX (US); Keith Raymond Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 898 days.

(21) Appl. No.: 11/039,510

(22) Filed: Jan. 20, 2005

(65) Prior Publication Data

US 2006/0161853 A1 Jul. 20, 2006

(51) Int. Cl.
*G06F 15/16* (2006.01)
*G06F 3/00* (2006.01)

(52) U.S. Cl. .................. 709/204; 709/205; 715/758

(58) Field of Classification Search .......... 709/204, 709/205; 715/758
See application file for complete search history.

(56) References Cited

U.S. PATENT DOCUMENTS

| | | | | |
|---|---|---|---|---|
| 6,584,493 B1 * | 6/2003 | Butler | | 709/204 |
| 6,691,162 B1 * | 2/2004 | Wick | | 709/224 |
| 7,305,627 B2 * | 12/2007 | Tannenbaum | | 715/751 |
| 2002/0021307 A1 | 2/2002 | Glenn et al. | | 345/753 |
| 2003/0018725 A1 * | 1/2003 | Turner et al. | | 709/206 |
| 2004/0054802 A1 | 3/2004 | Beauchamp et al. | | 709/238 |
| 2004/0107254 A1 * | 6/2004 | Ludwig et al. | | 709/204 |
| 2004/0116137 A1 | 6/2004 | Bells et al. | | 455/466 |
| 2004/0260753 A1 * | 12/2004 | Regan | | 709/200 |
| 2005/0055416 A1 * | 3/2005 | Heikes et al. | | 709/207 |
| 2005/0262204 A1 * | 11/2005 | Szeto et al. | | 709/206 |
| 2006/0112343 A1 * | 5/2006 | Ducheneaut et al. | | 715/758 |
| 2006/0112344 A1 * | 5/2006 | Ducheneaut et al. | | 715/758 |

* cited by examiner

*Primary Examiner*—William C Vaughn, Jr.
*Assistant Examiner*—Umar Cheema
(74) *Attorney, Agent, or Firm*—Yee & Associates, P.C.; William H. Steinberg

(57) ABSTRACT

A method and apparatus is provided for automatically detecting display sharing, setting display sharing status, and generating alerts in instant messaging. If the display is shared, the present invention intercepts an instant message before it is displayed and generates alerts to senders. Senders have options to display the message, delete the message, or allow the message to be queued until display is no longer shared. Alternatively, if the sender's instant messaging application supports the functionality, the mechanism of the present invention may present the user with options to display the message or allow the message to be queued until display is no longer shared without sending an alert message. A privacy list of contacts may be automatically built when integrated with a calendar system for controlling instant messaging access and behavior.

3 Claims, 7 Drawing Sheets

METHOD FOR AUTOMATIC DETECTION OF DISPLAY SHARING AND ALERT GENERATION IN INSTANT MESSAGING

BACKGROUND OF THE INVENTION

1. Technical Field

The present invention relates to an improved data processing system. In particular, the present invention relates to an instant messaging system in a data processing system. Still more particularly, the present invention relates to detecting display sharing and generating alerts automatically in an instant messaging system.

2. Description of Related Art

Instant messaging is an online chat medium, allowing users to communicate with each other and to collaborate in real-time over a network data processing system. Instant messaging is commonly used over the Internet. Instant messaging applications monitor and report the status of users that have established each other as online contacts. This information is typically presented to a user in a window. Instant messaging applications also are often used by users conducting business.

By utilizing instant messaging, business users can view each other's availability and initiate a text conversation with colleagues or customers when a desired contact becomes available. Millions of users communicate using instant messaging systems every day. With instant messaging becoming an important part of both personal and business communications, functionality and usability enhancements are important to the continued success of this type of communication tool.

Presently available instant messaging applications provide visible and/or audible alerts when receiving incoming chat messages. Examples of instant messaging applications include SameTime, a product available from International Business Machines Corporation; MSN Messenger, a product available from Microsoft Corporation; Yahoo! Messenger, a product available from Yahoo! Inc.; and AOL Instant Messenger, a product available from American Online.

However, these alerts may become a nuisance for users. Particularly, for users who share their display with other participants, these unanticipated alerts become a concern based on many reasons. Users may share their display either physically or electronically over the network with other participants to conduct meetings.

One of the reasons is that visible or pop-up alerts from an incoming instant message may contain personal, non-professional, or private information. A visible or pop-up alert allows those who share the display to view the content of incoming instant messages. This causes a leak of private or personal information and distraction for those who participate.

Even in situations where specific applications instead of the whole display are shared, the appearance of a visible or pop-up alert is distracting and breaks presentation flow. For example, display-sharing applications, such as NetMeeting, a product available from Microsoft Corporation, may show a grey box to meeting participants when a visible or pop-up alert is displayed. Even though no private or personal information is leaked, the grey box still causes distractions to meeting participants and breaks presentation flow.

To alleviate this problem, most instant messaging applications allow users to disable the application or set the status of the application to block incoming messages. However, this solution is not always effective, because some users may still require the instant messaging application to run in order to communicate with other participants. Other participants may also rely on the instant messaging application to provide connection information.

Another reason that visible or pop-up alerts are a concern is that some users may prefer to stay reachable via the instant messaging application while sharing their display. Currently, these users may change their instant messaging status to "away" and display an alert message to senders that other participants may view the content of the instant message they are about to send. However, this solution is also not always effective, because users may forget to change their status before sharing their display or senders may ignore or fail to see the status message altogether.

Furthermore, a private list may be created by a user in instant messaging applications to allow certain contacts to see the status of the user as "online". While this solution may reduce the likelihood of visible or pop-up alerts by filtering out public contacts, this solution cannot eliminate the problem, since those in the private list are the ones who will most likely send messages. In addition, the maintenance of a unique private list for each sharing may become a burden for the user.

Therefore, it would be advantageous to have an improved method, apparatus, and computer instructions for automatically detecting display sharing and generating alerts in an instant messaging system.

SUMMARY OF THE INVENTION

A method, apparatus, and computer instructions are provided for automatically detecting display sharing and generating alerts in instant messaging. The present invention may detect the environment for a display-sharing tool and determine a display sharing tool status. If display sharing is currently in progress, the mechanism of the present invention intercepts incoming instant messages and sends alert messages to the sender. Instead of immediately displaying the instant message, the mechanism of the present invention receives the instant message according to behavior specified by the user. Upon receipt of the alert message, the sender may return messages to indicate whether to display, delete, or, through no action, allow the instant message to be queued until the display sharing is no longer in progress.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
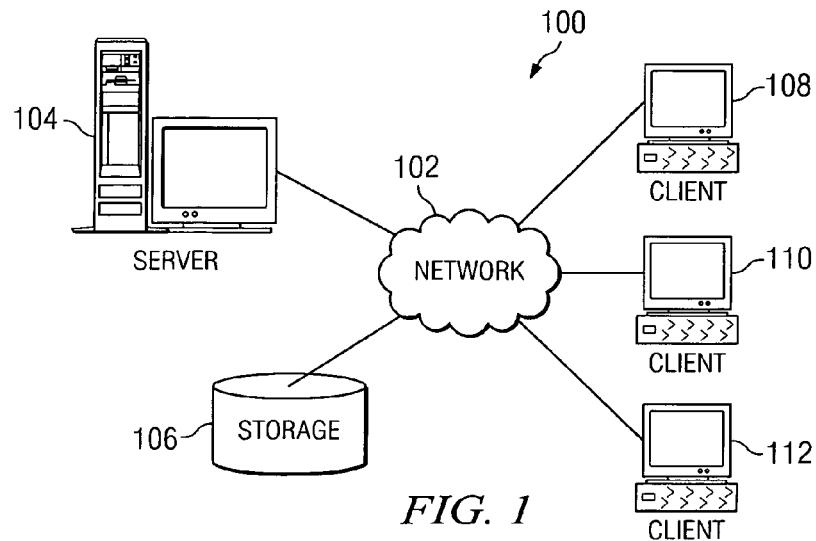
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational, and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
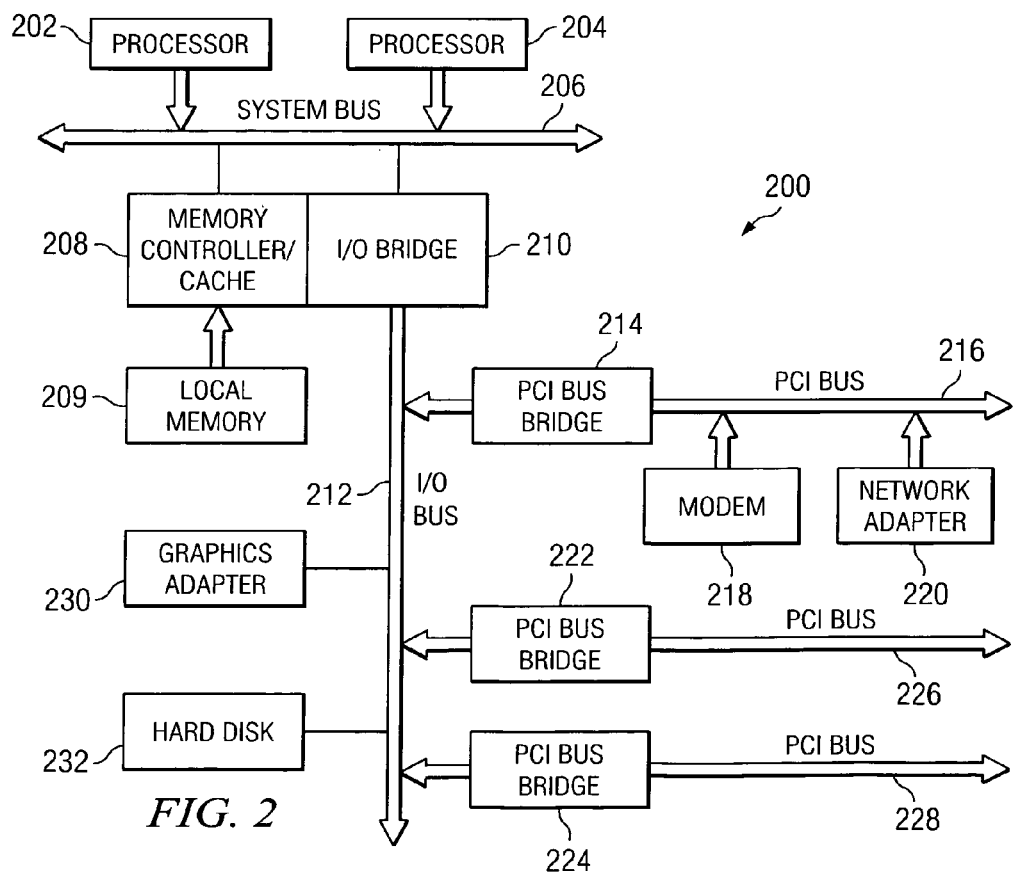
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

Figure 3:
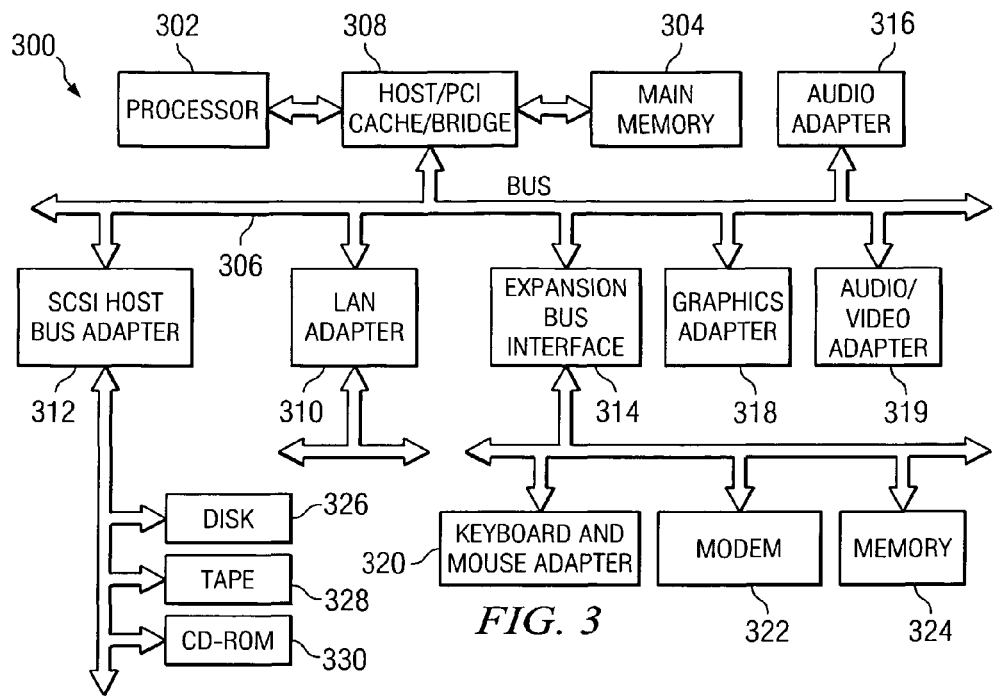
FIG. 3 is a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces. As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The present invention provides a method, apparatus, and computer instructions for detection of display sharing and alert generation in an instant messaging system. In a preferred embodiment, the mechanism of the present invention automatically detects the environment of a data processing system to determine if the display is being shared by the user. Alternatively, a user may manually engage the mechanism of the present invention in case the environment may not be detected.

The mechanism of the present invention may detect both local hosting and remote hosting environment. A host is a user who is sharing the display. Local hosting is physically sharing the display among multiple participants, for example, when a group of participants physically sees the display. Remote hosting is electronically sharing the display among multiple participants using a display sharing tool.

In order to determine if the display is being shared, the mechanism of the present invention may poll the operating system of the data processing system for a remote display sharing tool that is running as a process. In a preferred embodiment, the mechanism of the present invention maintains a set of footprints to be used for searching a number of common display sharing tools. Alternatively, a user may specify a footprint or clue for the mechanism of the present invention to identify a particular display sharing tool. For example, a user may provide the name of a process, such as conf.exe, to identify NetMeeting.

While a display sharing tool may be running as a process in a data processing system, the user may not necessarily be sharing the display with other participants at the time. In order to determine whether the display is shared with other participants, the mechanism of the present invention may examine other factors to determine a status of the display sharing tool using an available application programming interface. Examples of other factors include the window title, the dynamic settings of the data processing system, such as Microsoft Windows registry, other processes currently executing in the data processing system, and current network port usage.

For example, the mechanism of the present invention may query the window title bar of NetMeeting to determine whether it reads 'NetMeeting—Not in a call' or 'NetMeeting—number of Connections'. If it reads 'NetMeeting—Not in a call', no meeting is currently in progress, and the display is not being shared by other participants. However, if it reads 'NetMeeting—Number of Connections', a meeting is currently in progress, and the display is being shared by other participants. The number of connections displays the number of active connections.

In cases where both the host and other participants share the same window title, the mechanism of the present invention determines if the user is an actual host in a number of ways. One way is to examine the window title of the display sharing tool when a call is placed or received, since the window title of the host is different from other participants. Another way is to determine if the window title reads 'Host a meeting'. The third way is to determine if the window title reads 'participant's name display'. If the window title does not read 'participant's name display', the user is probably a host. Participant's name is the name of any one of the participants.

In cases when there is no available application programming interface that the mechanism of the present invention may use to poll the display sharing tool for the status of the sharing display, the user may define a footprint and engage it manually to set or change the status of display sharing. In this way, the user may still take advantage of other features of the present invention, such as generation of alerts.

In addition to detecting the environment for display sharing tool and its corresponding status, the mechanism of the present invention provides user's online status to the instant messaging server, which can be passed on to others who look for the user's status in their contact list. Furthermore, the status may warn others when they open a chat window to initiate an instant message with the user, who is sharing the display, and provide options to others as to how the message should be processed.

For example, the sender may be given an extra button to 'Send Now' for displaying the message to the user immediately. In addition, the sender may follow the ordinary 'Send' process to queue the message at the user's instant messaging application until the user is ready to receive the message.

Subsequently, the mechanism of the present invention recognizes the sender's preference from the sending choice of the sender, and follows the last instruction given by the sender without re-displaying warning messages to provide choices of 'Send Now' or queue the message.

In addition to providing user's online status, the mechanism of the present invention automatically generates alerts when incoming instant messages arrive, assuming the sender was not already warned. The mechanism of the present invention allows a user to configure desirable behavior, such that when an instant message arrives, an alert is displayed to the user instead of the instant message.

For example, a user may configure a behavior to blink the instant messaging application and display the sender's name when an instant message arrives. The mechanism of the present invention detects an incoming instant message and intercepts the instant message before it is displayed. Then, the mechanism of the present invention may blink the instant messaging application and display the sender's name, rather than display the instant message in the foreground.

Alternatively, the user may configure a behavior to hide incoming instant messages by queuing the messages until display sharing is complete or when a manual override is performed by the user. In addition, the mechanism of the present invention may automatically reply to the sender of the instant message with a message and instructions, assuming the sender was not already warned of the display sharing. The message and the instructions may include a warning that a display sharing is in progress and an inquiry of whether the sender wants to proceed with displaying the instant message. This warning may be configurable by the user.

In a preferred embodiment, the sender may indicate in a return message whether to 'Send Now' or 'Cancel Message'. If the sender indicates a 'Send Now' in a return message, the queued instant message is displayed even though the display is being shared. This means that the sender thinks that either the instant message is safe for display, or the instant message is important for the user. If the sender indicates a 'Cancel Message' return message, the queued instant message is deleted. Subsequently, the mechanism of the present invention recognizes the sender's preference from the previous return message or lack thereof, and follows the last instruction given by the sender without re-sending auto-reply or warning messages. Furthermore, the mechanism of the present invention may provide clickable buttons to signify the desired sender actions of 'Send Now' or 'Cancel Message' without requiring the sender to type in the commands.

Figure 4:
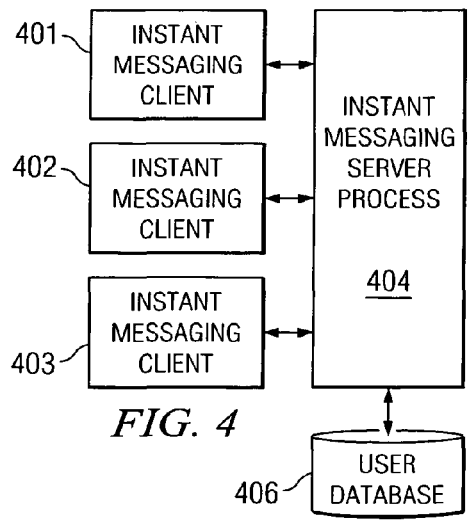
FIG. 4 is a block diagram illustrating components used in an instant messaging system in accordance with a preferred embodiment of the invention.

In a preferred embodiment, the mechanism of the present invention may be implemented in an instant messaging application, such as instant messaging client 401 in FIG. 4, in a data processing system, such as data processing system 300 in FIG. 3. In an alternative embodiment, the mechanism of the present invention may be implemented in an instant messaging service provider application, such as instant messaging server process 404 in FIG. 4, in a data processing system, such as data processing system 200 in FIG. 2.

If the mechanism of the present invention is implemented in an instant messaging service provider application, the mechanism of the present invention may poll the display-sharing tool running on the user's computer for a status. In addition, the mechanism of the present invention may deliver warning messages and confirmations between the user and senders without involvement of the user's instant messaging application.

Furthermore, the mechanism of the present invention provides an option for the use of a privacy list. A privacy list is a list of contacts configured by a host for the purpose of limiting who may send instant messages to the host for a short period of time, or for the purpose of limiting who must go through the warning or return request process. The privacy list also provides an alternative way for other participants to interact with the host while they are participating in the display sharing environment.

In a preferred embodiment, the user may manually add contacts to the privacy list from a contact list. In an alternative embodiment, the user may set up a template to include a list of contacts only for a certain period of time of a certain date or a number of dates. For example, a user may set up a template with a list of contacts to be active for a regular meeting on Tuesdays at 10:00 a.m.

Thus, once the user sets up the template, the mechanism of the present invention may automatically allow the contacts in the list to send instant messages to the user at the time specified. No other contacts outside the list may engage the user at that time. Alternatively, the mechanism of the present invention may notify other contacts who want to engage the user at that time with warning messages that the user currently does not want to be engaged.

In yet another alternative embodiment, the mechanism of the present invention may leverage existing calendar systems to build a privacy list automatically based on the calendar entry's invitees. Examples of existing calendar systems include Lotus Notes, a product available from International Business Machines Corporation, and Microsoft Outlook, a product available from Microsoft Corporation.

For example, when the user invites ten participants for a meeting using the calendar system, the mechanism of the present invention may detect the email address, or some other instant messaging identifier, of these participants based on the profile maintained by the calendar system and automatically set up a privacy list including these participants based on their email addresses or identifiers.

Moreover, the mechanism of the present invention may interact with the display sharing tool via an application programming interface to obtain a list of active participants. The mechanism of the present invention then uses a central directory or distributed directories to map each participant to an instant messaging identifier. In this way, a more representative privacy list of the participants may be generated who may not be invited via the calendar system.

Turning now to FIG. 4, a block diagram illustrating components used in an instant messaging system in accordance with a preferred embodiment of the present invention is shown. In this illustrative example, a user at instant messaging client 401 may send or exchange messages with other users at instant messaging clients 402 and 403. These instant messaging clients may be executing on a data processing system, such as data processing system 300 in FIG. 3. The exchange of messages in these examples is facilitated through instant messaging server process 404. This process allows for users to find other users within the instant messaging system as well as aid in the exchange of messages between different users.

Depending on the particular instant messaging system, instant messaging server process 404 may only be involved in providing an indication of when particular users are online and for establishing initial contacts while users contacting users already on a buddy list may contact those users directly after seeing that a particular user is online. Instant messaging server process 404 may be located on a server, such as data processing system 200 in FIG. 2.

In these examples, the different users registered to the instant messaging system are stored in user database 406. This user database provides information needed to search for and find other users as well as contact users when they are online.

Figure 5:
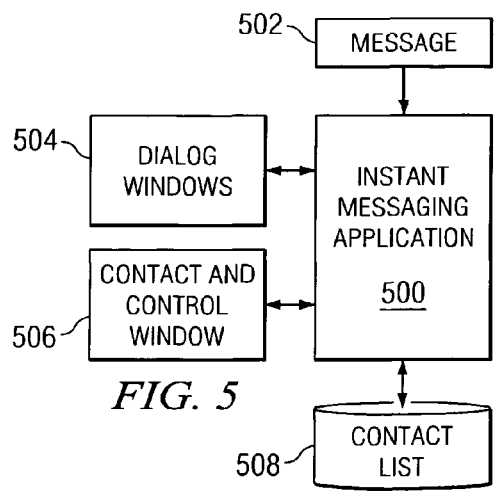
FIG. 5 is a diagram illustrating an instant messaging client in accordance with a preferred embodiment of the present invention.

Turning next to FIG. 5, a diagram illustrating an instant messaging client is depicted in accordance with a preferred embodiment of the present invention. The components illustrated in FIG. 5 may be found in an instant messaging client, such as instant messaging client 401, 402, or 403 in FIG. 4. These components may be implemented in a data processing system, such as data processing system 300 in FIG. 3.

In the illustrative example, instant messaging application 500 processes messages, such as message 502, received from users located on remote data processing systems. As messages are received, these messages are presented in dialog windows 504. Additionally, dialog windows 504 provide an interface for a user to input text to send messages to other users.

Contact and control window 506 is presented by instant messaging application 500 to provide the user with a list of user names, as well as other information. Contact and control window 506 also provides an interface to allow a user to set different preferences. For example, the user may set passwords required to access different names used in instant messaging sessions.

Further, a list of names presented by contact and control window 506 are stored in contact list 508 in these examples. Additional user or screen names may be added to or deleted from contact list 508. This contact list is employed in presenting the list of names within contact and control window 506.

Figure 6:
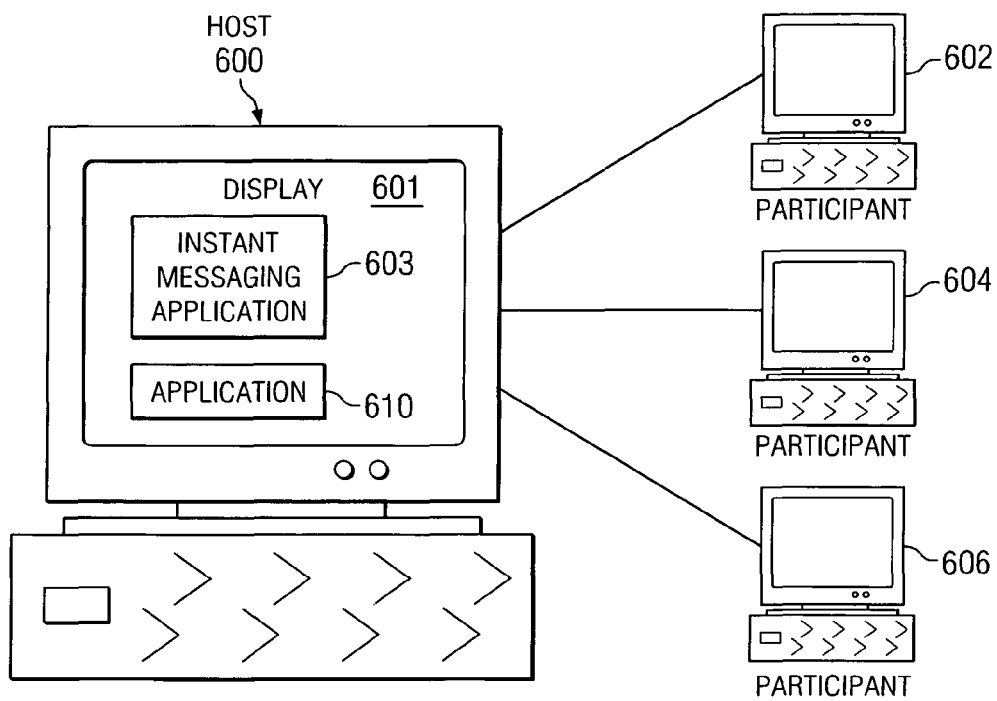
FIG. 6 is a diagram illustrating relationships between a host and other participants in a display sharing environment in accordance with a preferred embodiment of the present invention.

Turning now to FIG. 6, a diagram illustrating relationships between a host and other participants in a display sharing environment is depicted in accordance with a preferred embodiment of the present invention. As shown in FIG. 6, host 600 may be a user, who is sharing application 610 on display 601 with other participants.

Host 600 may be a local host, meaning that display 601 may be viewed by other participants who are physically sitting nearby display 601. On the other hand, host 600 may be a remote host, meaning that participants 602, 604, and 606 may view display 601 using a display sharing tool that is currently running on host 600, such as NetMeeting.

In addition to application 610, host 600 may be running instant messaging application 603, which is an implementation of instant messaging client, such as instant messaging client 401 in FIG. 4. With the prior art, when a contact sends an instant message via instant messaging application 603 to host 600, the instant message is automatically displayed on display 601. Thus, other participants, such as participants 602, 604, and 606, may view the content of the instant message as the instant message is displayed automatically by instant messaging application 603 on display 601.

With the mechanism of the present invention, those who check the instant messaging status of the user will see a message that the user's display is shared and that messages will be queued unless further action is taken. This status is configurable by the user.

In addition, if the sender's instant messaging application 603 determines the status of the user's display as being shared, the application can provide warning and alternate actions up front, allowing the user to specify whether to display the message despite the display sharing or allow the message to be queued.

With the mechanism of the present invention, incoming instant messages that are sent via instant messaging application 603 are controlled. When an instant message is received from a contact via instant messaging application 603, the mechanism of the present invention first polls the status to determine whether or not a display-sharing tool is sharing display 601 on host 600. The status is determined via a separate process on the host machine.

If host 600 is currently sharing display 601, the mechanism of the present invention intercepts incoming instant messages based on the configuration set by host 600 and performs behaviors configured by the user, for example, blinking, instead of displaying the incoming instant message right away.

In addition, the mechanism of the present invention generates an alert to notify the sender that host 600 is sharing display 601. The alert also provides the sender 'Send Now' or 'Cancel Message' instructions to send a return message with a 'Send Now' for continuing to display the instant message or a 'Cancel Message' for deleting the sent instant message. If the sender chooses to ignore the alert, the mechanism of the present invention queues the instant message pending further instructions from host 600. Thus, the mechanism of the present invention enables host 600 to decide from whom, when, and how incoming instant messages are displayed on display 601 when display sharing tool is running.

Figure 7:
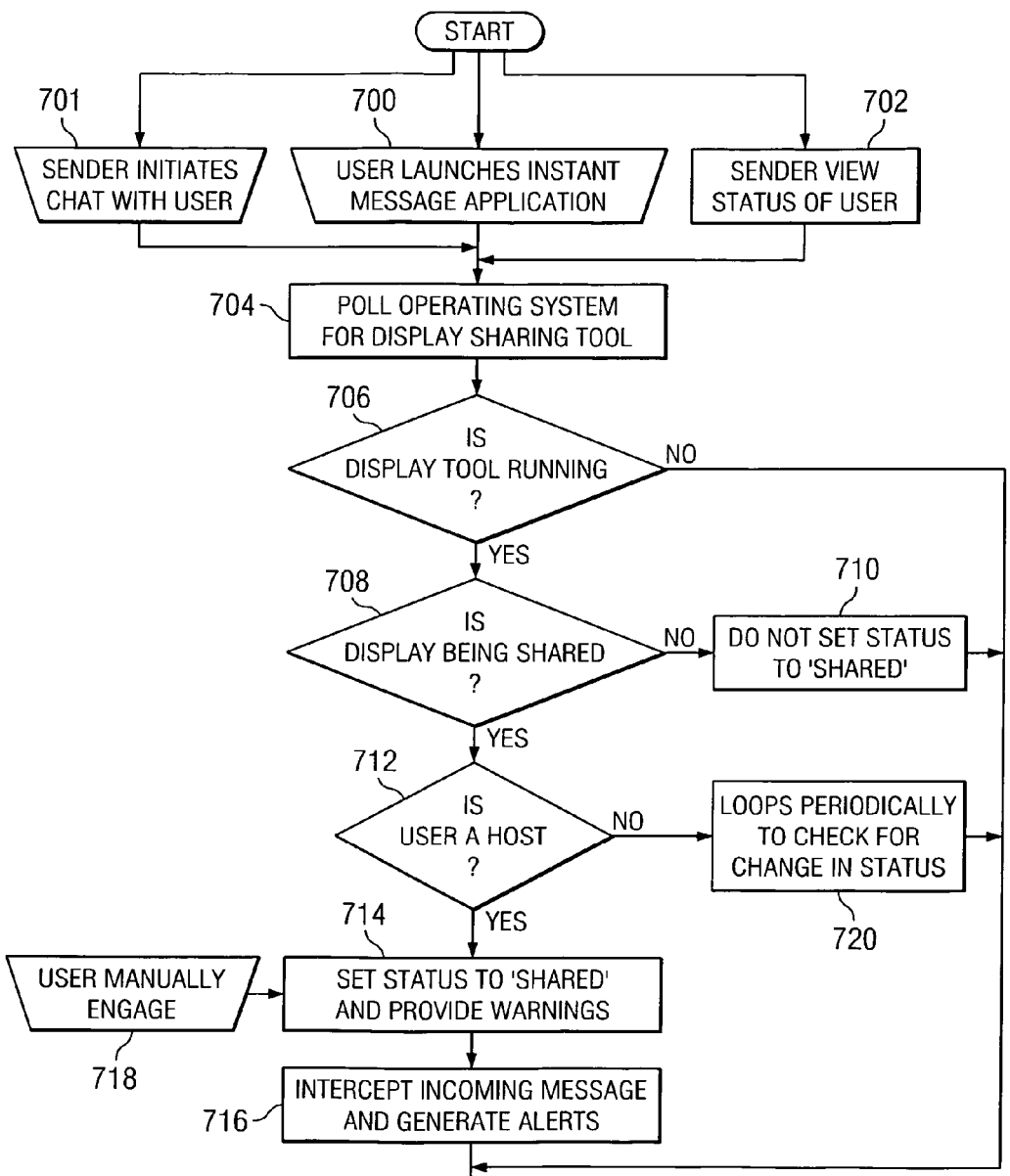
FIG. 7 is a flowchart of an exemplary process for detecting display sharing in accordance with a preferred embodiment of the present invention.

Turning now to FIG. 7, a flowchart of an exemplary process for detecting display sharing is depicted in accordance with a preferred embodiment of the present invention. This exemplary process is performed by the mechanism of the present invention.

As depicted in FIG. 7, the process begins when a user launches an instant messaging application (step 700). Alternatively, the process may begin when a sender initiates a chat with a user (step 701) or when a sender views status of a user via an instant messaging application (step 702). The mechanism of the present invention then uses an existing application programming interface to poll the operating system for a display sharing tool currently running as a process (step 704).

The mechanism of the present invention maintains a set of footprints to be used for searching a number of common display sharing tools. Alternatively, the mechanism of the present invention may use footprints defined by the user to identify a particular display sharing tool. For example, a user may provide the name of a process, such as conf.exe, to identify NetMeeting.

Next, the mechanism of the present invention determines if a display-sharing tool is currently running on the user's data processing system based on the footprints (step 706). If no display-sharing tool is currently running, the process terminates thereafter. Otherwise, the mechanism of the present invention determines if user's display is currently being shared by other participants (step 708).

If user's display is not currently being shared, the mechanism of the present invention does not set the status of display sharing to 'shared' (step 710), since no other participants are sharing the display. Otherwise, the mechanism of the present invention determines if the user is a host (step 712). This step may be performed by examining the window title of the user's display sharing tool or any other factors.

If the user is a host, the mechanism of the present invention sets the status of display sharing to 'shared' (step 714), which in turn sets the user's online status, and provides warnings to senders who begin to initiate a chat and whose instant messaging application supports such functionality.

The mechanism of the present invention then intercepts incoming messages for processing (step 716). Step 716 is discussed in further detail in FIG. 8. Thus, the process terminates thereafter. However, if the user is not a host, the mechanism of the present invention loops periodically to constantly monitor a change in status (step 720) and the process terminates thereafter.

In cases when no application programming interface is available to poll status of a display sharing tool, the user may manually engage the mechanism of the present invention (step 718) to set their online status and display sharing status to 'shared' (step 714). Then, the mechanism of the present invention intercepts incoming instant messages and generates alerts (step 716).

Once the display sharing status is set to 'shared', the 'shared' display status remains until the user manually removes the status, the user closes the instant messaging application, or the user exits or disconnects the display sharing tool.

If the user manually removes the status despite the display sharing tool still acting as a host, the only events that will re-enable display sharing is when the user manually re-enables it. If the user exits and then re-engages the display sharing tool, or if the user exits the instant messaging application and reconnects, the user also has to manually re-enable display sharing. In this way, the mechanism of the present invention does not have to constantly set the status to 'shared', since the user has already indicated not to set this status despite sharing their display.

Figure 8:
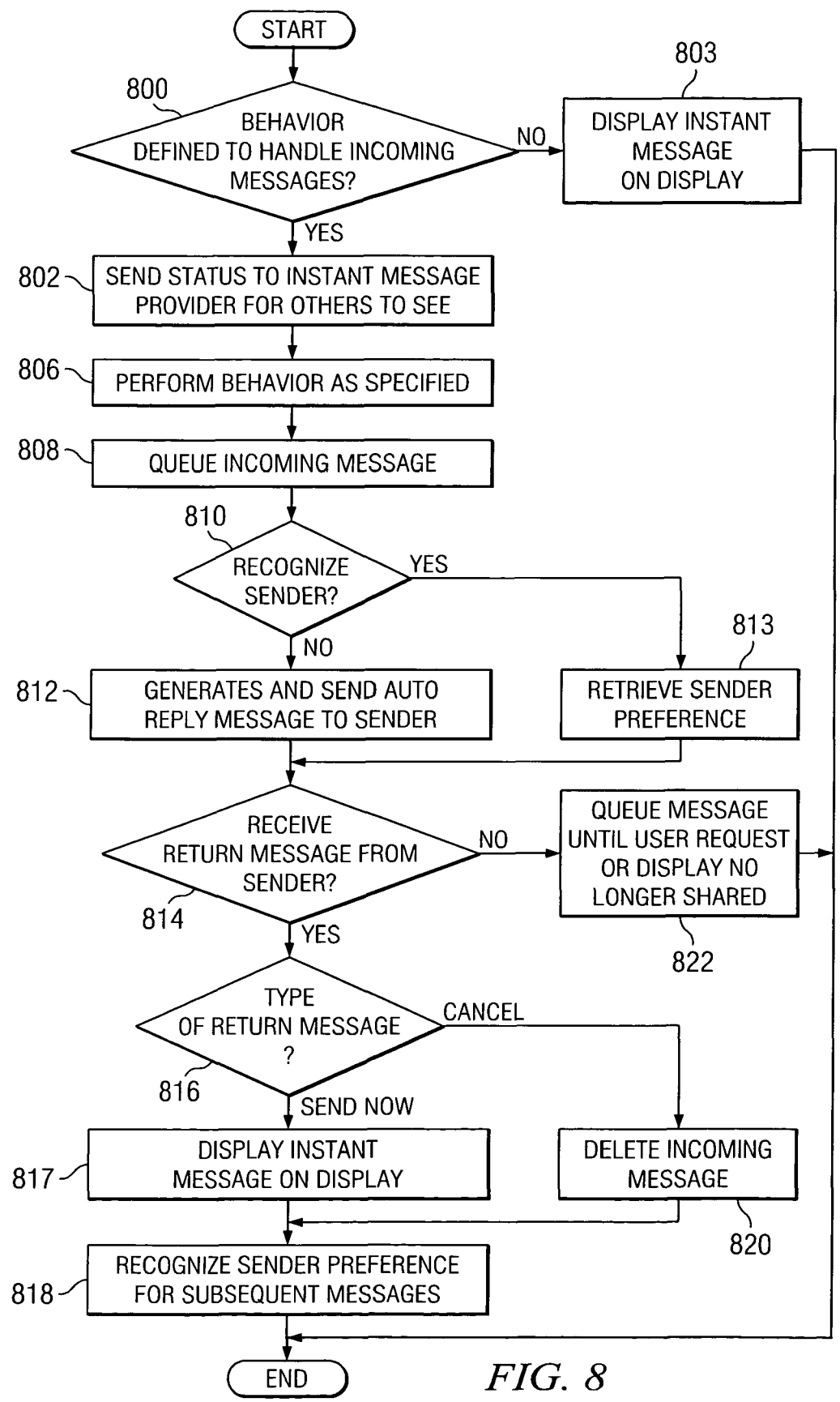
FIG. 8 is a flowchart of an exemplary process for intercepting incoming instant messages and generating alerts when the user launches the instant message application in accordance with a preferred embodiment of the present invention.

Turning now to FIG. 8, a flowchart of an exemplary process for intercepting incoming instant messages and generating alerts when the user launches the instant message application is depicted in accordance with a preferred embodiment of the present invention. This process describes step 716 in FIG. 7 in further detail.

As depicted in FIG. 8, the process begins when the mechanism of the present invention determines if the user defined desirable behavior for handling incoming instant messages (step 802). For example, a user may specify hiding the incoming instant message and blinking the instant messaging application when an instant message is received.

If the user defined a desirable behavior, the mechanism of the present invention sends the status of 'shared' to the instant messaging service provider, such that others may view the status of the user (step 802). The mechanism of the present invention then performs the specified behavior (step 804) instead of displaying the incoming instant message on the display right away. If the user did not define a desirable behavior, the mechanism of the present invention displays the instant message on the display (step 803), and the process terminates thereafter.

Once the desired behavior is performed, the mechanism of the present invention queues the incoming message (step 808) and determines if the sender is recognized (step 810). The sender is recognized if the sender has previously sent an instant message while the user is sharing display. If the sender is not recognized, the process continues to step 812.

At step 812, the mechanism of the present invention generates an auto-reply message, which includes configurable instructions for warning the sender that the user is currently sharing the display and that the instant message may not be displayed. The mechanism of the present invention then sends the warning message with instructions to the sender. The process then continues to step 814. When the warning message is received by the sender, the sender may specify in a return message that either it is safe to display the instant message on the display and bypass the intercept mode (Send Now), to cancel the message (Cancel Message), or through no return message, to keep the instant message queued for later retrieval by the user. These messages may also be sent by clicking dedicated buttons within the instant messaging application.

Turning back to step 810, if the sender is recognized, the mechanism of the present invention retrieves the preference given by the sender in the previous return message (step 813), and the process continues to step 814. At step 814, the mechanism of the present invention determines if a return message is received from the sender.

If a return message is received, the mechanism of the present invention determines the type of return message received from the sender (step 816). Types of return message includes a 'Send Now', 'Cancel Message', or similar return message. In this exemplary process, a 'Send Now', 'Cancel Message', or similar return message is used to indicate user preferences. By specifying a 'Send Now' return message, the sender wants the user to receive the instant message regardless of whether the user's display is being shared by other participants.

If a 'Send Now' return message is received, the mechanism of the present invention removes the instant message from the queue and displays the message on the display (step 817) and the process continues to step 818.

Turning back to step 816, if the message received from the sender is a 'Cancel Message' or similar return message, the mechanism of the present invention removes the instant message from the queue and deletes the message (step 820), and the process continues to step 818.

At step 818, the mechanism of the present invention recognizes the sender's preference based on the return message or lack thereof. Thus, subsequent instant messages received from the same sender are processed according to the preference given by the sender without re-generating or re-sending auto-reply messages Turning back to step 814, if no return message is received from the sender, meaning that sender takes no action, the mechanism of the present invention queues the instant message until either the display is no longer shared by the user, or when the user manually requests instant messages to be displayed (step 822). Thus, the process terminates thereafter.

Figure 9:
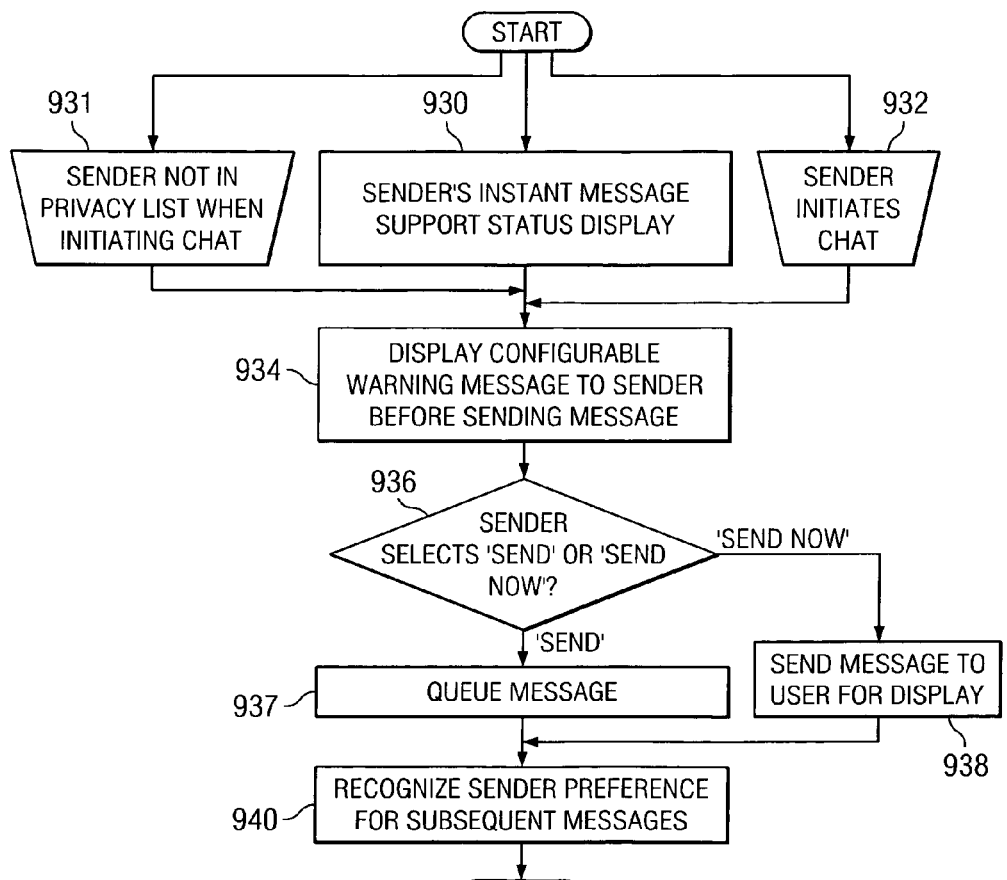
FIG. 9 is a flowchart of an exemplary process for intercepting incoming instant messages when the sender initiates a chat or the sender views the user's status in accordance with a preferred embodiment of the present invention.

Turning now to FIG. 9, a flowchart of an exemplary process for intercepting incoming instant messages when the sender initiates a chat or the sender views the user's status is depicted in accordance with a preferred embodiment of the present invention. This process is described from the sender's perspective.

As shown in FIG. 9, the process begins when sender's instant messaging application supports a display of the user's status (step 930). Alternatively, the process may begin when the sender initiates a chat with the user (step 932). In addition, the process may also begin when the sender tries to initiate a chat, but the sender is not in the user's dynamically generated privacy list (step 931).

If any of the above steps occurs, the mechanism of the present invention presents the potential sender a configurable warning message prior to sending the message to the user. The warning message includes a special button to either 'Send Now' despite the fact that the display is being shared or a 'Send' button, a default option to queue the message (step 934).

If a 'Send Now' button is selected, the mechanism of the present invention sends the message to the user for display (step 938) and the process continues to step 940. However, if a 'Send' button is selected, the message is queued (step 937) and the process continues to step 940.

At step 940, the mechanism of the present invention then recognizes the sender's preference as to whether to 'Send Now' or queue the message. Thus, subsequent messages by the sender will follow the last instruction given and recognized by the present invention while the user's display is being shared, with no further warnings or alerts generated and displayed to the sender.

Figure 10:
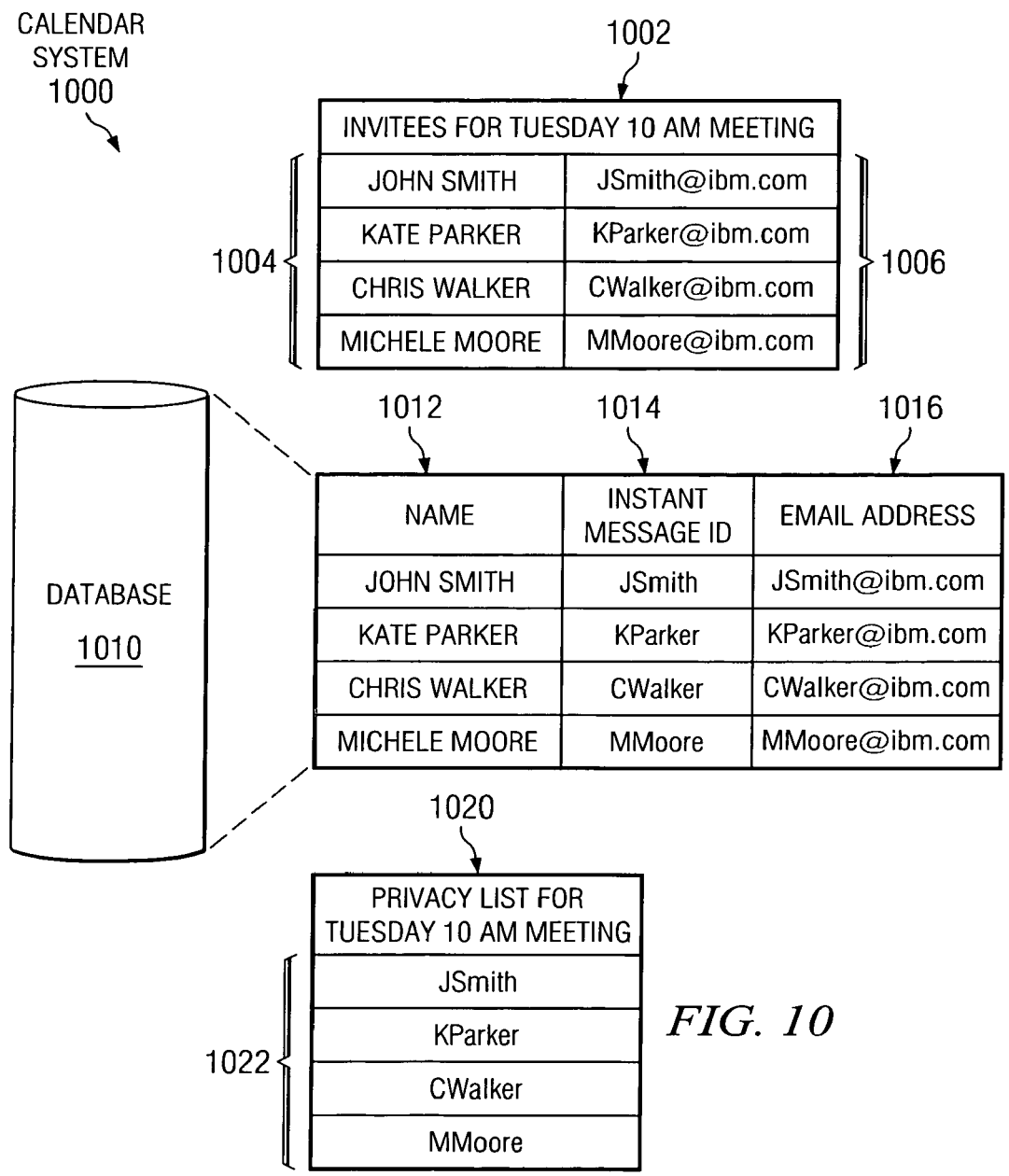
FIG. 10 is a diagram illustrating an exemplary implementation of automatic building of a short term privacy list in accordance with a preferred embodiment of the present invention.

Turning now to FIG. 10, a diagram illustrating an exemplary implementation of automatic building of short term privacy list is depicted in accordance with a preferred embodiment of the present invention. As shown in FIG. 10, in this example implementation, a user may schedule a meeting using calendar system 1000. Examples of calendar systems include Microsoft Outlook, a product available from Microsoft Corporation; Lotus Notes, a product available from International Business Machines Corporation.

In this example, the user scheduled a meeting on Tuesday at 10:00 a.m. FIG. 10 shows a calendar entry 1002 for the meeting scheduled, which includes a list of invitees 1004 and their corresponding email addresses 1006. Email addresses 1006 are used in calendar system 1000 to identify individual invitees. The user may build a privacy list manually by selecting members from a contact list, such as contact list 508 in FIG. 5.

On the other hand, the mechanism of the present invention may build a privacy list automatically by retrieving the list of invitees 1004 from calendar system 1000. The mechanism of the present invention then refers to database 1010, which includes a mapping of the invitees 1012, their corresponding instant messaging identifiers 1014, and their email addresses 1016. Database 1010 may be a central database or distributed directories that the user populated.

From the mapping provided by database 1010, the mechanism of the present invention may build a privacy list for Tuesday 10:00 a.m. meeting 1020, which includes instant messaging identifiers of each of the invitees 1022. Once a privacy list is built, no one other than those in the privacy list may send an instant message to the user. Alternatively, the user may continue to allow all senders to send messages, but bypass the alert generation process for those on the privacy list, since those on the privacy list already know that the user's display is 'shared'.

Furthermore, since the display sharing tool may also use email addresses as identifiers for each participant, the mechanism of the present invention may integrate the display sharing tool and the calendar system to identify a privacy list 'on the fly', even though the instant messaging identifiers of the participants are not known.

In summary, the present invention automatically detects display sharing and generates appropriate alerts to the sender upon receiving an instant message. The present invention allows the user or host to specify footprints for detecting display sharing tools and perform desirable behavior other than displaying the instant message upon receipt.

In addition, the present invention warns the sender that display sharing is in progress and gives the sender an option to either continue to send and display the instant message or queue the instant message for later retrieval by the user. The present invention also allows the sender to retract the instant message or delete the sent instant message.

Furthermore, the present invention may be implemented in an instant messaging application at the client computer or in an instant message service provider application on a server. If the present invention is implemented in the instant message service provider application, the mechanism of the present invention may receive the display sharing status of the user from the instant messaging application and publish this status to others via the instant messaging server as they view the status in their contact lists.

The instant message service provider application may also send a user-configurable warning message if someone opens a chat window to initiate a chat. If the potential sender's instant messaging application supports this functionality, the application may present a 'Send Now' button to the sender to indicate that the message should be displayed right away or a 'Send' button to the sender to indicate that the message should be queued.

In addition to display sharing tools, other types of applications may be detected by the mechanism of the present invention. For example, a user may be running a Web browser or a Windows Media Player, a product available from Microsoft Corporation, to participate in an online course or test. The mechanism of the present invention may detect that an online course or test is in progress.

Based on desirable behavior specified by the user, the mechanism of the present invention may be used to block incoming instant messages while the online course is in progress. Alternatively, the mechanism of the present invention may be used to send warning messages to the sender or queue instant messages until after the course is complete.

It is important to note that while the present invention has been described in the context of a fully functioning data processing system, those of ordinary skill in the art will appreciate that the processes of the present invention are capable of being distributed in the form of a computer readable storage medium of instructions and a variety of forms and that the present invention applies equally regardless of the particular type of signal bearing media actually used to carry out the distribution. Examples of computer readable storage medium include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method in a data processing system for automatic detection of display sharing and alert generation, the computer implemented method comprising:

determining, using an existing application programming interface, whether a display sharing tool is running as a process in the data processing system of a user using a set of footprints, wherein the display sharing tool allows a user to share a display, connected to the data processing system, with at least one participant, and wherein the set of footprints is defined by the user to identify a particular display sharing tool;

responsive to determining that the display sharing tool is running as a process in the data processing system of a user, determining whether the user is sharing the display with the at least one participant;

responsive to determining that the display sharing tool is running as a process in the data processing system of a user and the user is sharing the display with at least one participant, determining whether the user is a host by examining a window title;

responsive to determining that the display sharing tool is running as a process in the data processing system of a user, the user is sharing the display with the at least one participant, and the user is the host, setting a user online status to shared, wherein setting the user online status to shared alerts a set of senders that the user is sharing the display with the at least one participant;

responsive to determining that the display sharing tool is running as a process in the data processing system of a user, the user is sharing the display with the at least one participant, the user is the host, and setting the user online status to shared intercepting an instant message, wherein the intercepted instant message is not displayed on the display being shared by the user;

processing the intercepted instant message according to a user configured behavior;

determining whether a sender of the intercepted instant message is recognized, wherein the sender of the intercepted instant message is recognized when the sender has sent a previous instant message while the user was sharing the display with the at least one participant;

responsive to determining that the sender of the intercepted instant message is not recognized, generating an auto-reply alert to notify the sender of the intercepted instant message that the user is sharing the display, wherein the auto-reply alert indicates that the intercepted instant message will not be displayed;

sending the auto-reply alert to the sender of the intercepted instant message;
receiving a set of instructions from the sender of the intercepted instant message, wherein the set of instructions indicate one of cancelling the instant message and bypassing the intercepting of the intercepted instant message;
responsive to determining that the sender is recognized, retrieving a previous set of instructions sent by the sender; and
responsive to receiving a return message from the sender of the intercepted instant message, receiving a set of instructions from the sender of the intercepted instant message, wherein the set of instructions indicate one of cancelling the instant message and bypassing the intercepting of the intercepted instant message.

2. A computer program product comprising a computer readable storage medium in a data processing system storing executable instructions to be executed by a processor for automatic detection of display sharing and alert generation, the computer implemented method comprising:
  instructions for determining, using an existing application programming interface, whether a display sharing tool running as a process in the data processing system of a user using a set of footprints, wherein the display sharing tool allows a user to share a display, connected to the data processing system, with at least one participant, and wherein the set of footprints is defined by the user to identify a particular display sharing tool;
  instructions for responsive to determining that the display sharing tool is running as a process in the data processing system of a user, determining whether the user is sharing the display with the at least one participant;
  instructions for responsive to determining that the display sharing tool is running as a process in the data processing system of a user and the user is sharing the display with at least one participant, determining whether the user is a host by examining a window title;
  instructions for responsive to determining that the display sharing tool is running as a process in the data processing system of a user, the user is sharing the display with the at least one participant, and the user is the host, setting a user online status to shared, wherein setting the user online status to shared alerts a set of senders that the user is sharing the display with the at least one participant;
  instructions for responsive to determining that the display sharing tool is running as a process in the data processing system of a user, the user is sharing the display with the at least one participant, the user is the host, and setting the user online status to shared intercepting an instant message, wherein the intercepted instant message is not displayed on the display being shared by the user;
  instructions for processing the intercepted instant message according to a user configured behavior;
  instructions for storing the instant message in a memory of the data processing system;
  instructions for determining whether a sender of the intercepted instant message is recognized, wherein the sender of the intercepted instant message is recognized when the sender has sent a previous instant message while the user was sharing the display with the at least one participant;
  instructions for responsive to determining that the sender of the intercepted instant message is not recognized, generating an auto-reply alert to notify the sender of the intercepted instant message that the user is sharing the display, wherein the auto-reply alert indicates that the intercepted instant message will not be displayed;
  instructions for sending the auto-reply alert to the sender of the intercepted instant message;
  instructions for receiving a set of instructions from the sender of the intercepted instant message, wherein the set of instructions indicate one of cancelling the instant message and bypassing the intercepting of the intercepted instant message;
  instructions for responsive to determining that the sender is recognized, retrieving a previous set of instructions sent by the sender; and
  instructions for responsive to receiving a return message from the sender of the intercepted instant message, receiving a set of instructions from the sender of the intercepted instant message, wherein the set of instructions indicate one of cancelling the instant message and bypassing the intercepting of the intercepted instant message.

3. A computer implemented method in a data processing system for automatic detection of display sharing and alert generation, the computer implemented method comprising:
  a bus system;
  a memory connected to the bus system, wherein the memory includes a set of instructions; and
  a processing unit connected to the bus, wherein the processing unit executes the set of instructions to determine, using an existing application programming interface, whether a display sharing tool is running as a process in the data processing system of a user using a set of footprints, wherein the display sharing tool allows a user to share a display, connected to the data processing system, with at least one participant, and wherein the set of footprints is defined by the user to identify a particular display sharing tool; determining whether the user is sharing the display with the at least one participant, responsive to determining that the display sharing tool is running as a process in the data processing system of a user; determine whether the user is a host, responsive to determining that the display sharing tool is running as a process in the data processing system of a user and the user is sharing the display with at least one participant; set a user online status to shared, wherein setting the user online status to shared alerts a set of senders that the user is sharing the display with the at least one participant, responsive to determining that the display sharing tool is running as a process in the data processing system of a user, the user is sharing the display with the at least one participant, and the user is the host by examining a window title; intercepting an instant message, responsive to determining that the display sharing tool is running as a process in the data processing system of a user, the user is sharing the display with the at least one participant, the user is the host, and setting the user online status to shared, wherein the intercepted instant message is not displayed on the display being shared by the user;
  process the intercepted instant message according to a user configured behavior; store the intercepted instant message in a memory of the data processing system; determine whether a sender of the intercepted instant message is recognized, wherein the sender of the intercepted instant message is recognized when the sender has sent a previous instant message while the user was sharing the display with the at least one participant; generate an auto-reply alert to notify the sender of the intercepted instant message that the user is sharing the display, wherein the auto-reply alert indicates that the intercepted instant message will not be displayed; send the auto-reply alert to the sender of the intercepted instant message; receive a set of instructions from the sender of the intercepted instant message, wherein the set of instructions indicate one of cancelling the instant message and bypassing the intercepting of the intercepted instant message; retrieve a previous set of instructions sent by the sender, responsive to determining that the sender is recognized; and receive a set of instructions from the sender of the intercepted instant message, wherein the set of instructions indicate one of cancelling the instant message and bypassing the intercepting of the intercepted instant message, responsive to receiving a return message from the sender of the intercepted instant message.

* * * * *